Figure 1:
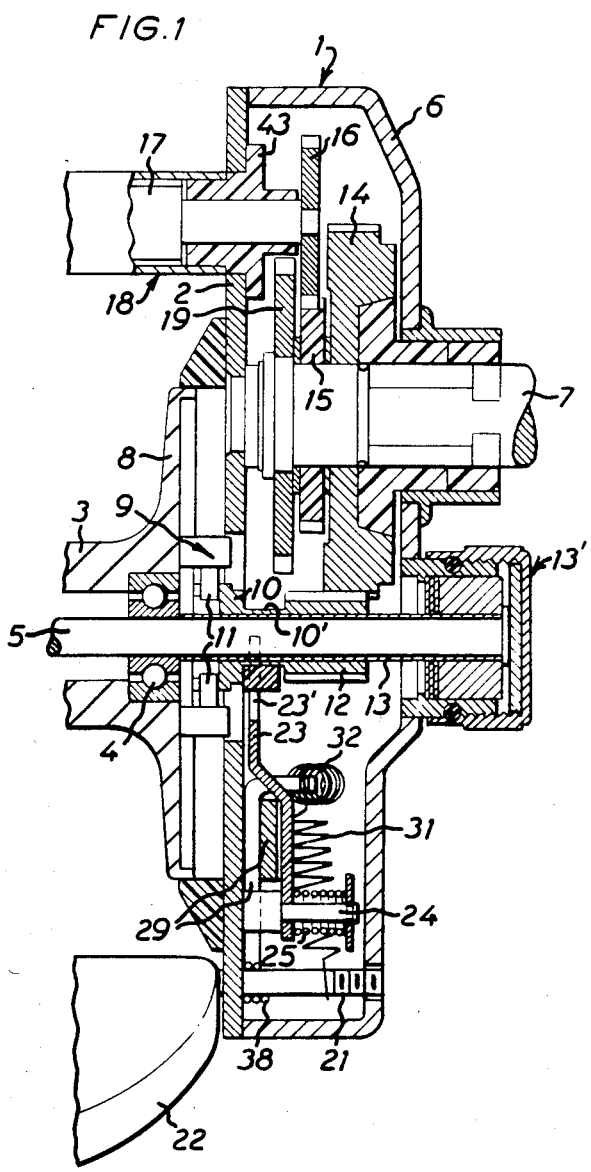

United States Patent [19]

Karlsson et al.

[11] Patent Number: 4,579,296

[45] Date of Patent: Apr. 1, 1986

[54] APPARATUS FOR THE DISENGAGEMENT AND REENGAGEMENT OF THE LINE SPOOL IN A FISHING REEL

[75] Inventors: Jarding U. Karlsson, Svängsta; Börje S. Moosberg, Mörrum, both of Sweden

[73] Assignee: ABU Aktiebolag, Svängsta, Sweden

[21] Appl. No.: 242,769

[22] Filed: Mar. 11, 1981

[30] Foreign Application Priority Data

Mar. 18, 1980 [SE] Sweden ................................ 8002092

[51] Int. Cl.$^4$ ............................................. A01K 89/015
[52] U.S. Cl. ................................. 242/220; 192/67 R; 192/93 R; 242/218
[58] Field of Search ................... 242/84.5 R, 84.51 R, 242/211, 212, 213, 214, 215, 216, 217, 218, 219, 220; 192/67 R, 93 A

[56] References Cited

U.S. PATENT DOCUMENTS

| | | | |
|---|---|---|---|
| 1,939,148 | 12/1933 | Spenny | 242/220 |
| 2,130,581 | 9/1938 | Case | 242/220 |
| 2,652,991 | 9/1953 | Murvall | 242/220 |
| 4,014,422 | 3/1977 | Morshita | 192/67 R |
| 4,168,812 | 9/1979 | Karlsson | 242/220 |
| 4,281,808 | 8/1981 | Noda | 242/218 |

*Primary Examiner*—Billy S. Taylor

*Attorney, Agent, or Firm*—Karl W. Flocks; Sheridan Neimark; A. Fred Starobin

[57] ABSTRACT

The disclosure relates to an apparatus for the disengagement of the line spool in relation to a transmission driven by a crank by means of a manually actuable operating member, and for automatic reengagement of the line spool and the transmission by means of the crank on rotation thereof for retrieval of the line on the line spool. The characterizing feature of the invention is that a locking mechanism for retaining the clutch between the line spool and the transmission driven by the crank includes a locking arm which is movably carried on a pivotally mounted lever in an arm system, and is disposed, on pivoting of the lever by means of the operating member for switching the arm system and the clutch from the engagement position to the disengagement position against the action of spring biasing, to be moved on the lever to a position for engagement with the locking member, and has means for realizing, by engagement with the locking member and the lever, a mutual locking of the mutually movable lever and locking arms until the locking member is once again rotated by means of the crank. As a result of this arrangement, use may be made, for the locking member, of a ratchet included in a known non-reverse mechanism for the crank.

3 Claims, 2 Drawing Figures

APPARATUS FOR THE DISENGAGEMENT AND REENGAGEMENT OF THE LINE SPOOL IN A FISHING REEL

The present invention relates to an apparatus for the disengagement and reengagement of the line spool in relation to a transmission driven by the crank in a fishing reel in which the line spool is rotatable in one direction by means of the crank by the intermediary of a gear wheel transmission and a disengageable clutch between the transmission and the line spool, and in which the crank and gear wheel transmission are locked against rotation in the opposite direction (reverse direction), by means of a ratchet and pawl mechanism consisting of a pawl and a ratchet connected to the crank, the disengagement and reengagement apparatus comprising a manual operating member for disengagement of the clutch and thereby for disengagement of the line spool from the transmission and the crank, a spring-biased locking mechanism to hold the clutch, after disengagement, in the disengaged position, and a device, cooperating with the crank, for causing automatic reengagement of the clutch.

Apparatuses of this type are previously known from, for example, Swedish Patent Specification No. 145,127 corresponding to U.S. Pat. No. 2,652,991 of Murvall issued Sept. 22, 1953, and have been improved as the result of a construction which is disclosed in Swedish Patent Specification No. 400,019 corresponding to U.S. Pat. No. 4,168,812 of Karlsson issued Sept. 25, 1979. In these prior art constructions, a clutch arm is actuable for shifting a clutch portion, which is rotatable by the crank by the intermediary of the transmission, into and out of engagement with a clutch portion connected to the line spool. The clutch arm is operable, against the action of a spring bias, by means of a manually actuable operating device and a lever, pivotal by means of the operating device, for disengagement of the clutch, a locking mechanism being simultaneously actuated and automatically locking the clutch arm and the shiftable clutch portion in the disengagement position. Reengagement of the clutch is automatic, when the crank is operated for retrieval of the line, in that a lock and release device which is rotatable by the crank and, together with a locking arm device, forms the locking mechanism, releases the locking arm device and thereby triggers the spring bias which, in its turn, returns the shiftable clutch portion by the intermediary of the coupling arm to the engagement position in order to permit rotation of the line spool by means of the crank. The automatic reengagement is very rapid in execution, as soon as the locking arms are released from engagement with the lock and release device which is rotatable in but one direction by means of the crank. However, for triggering the automatic reengagement, the crank must be rotated through a relatively large angle. A further disadvantage inherent in such prior art mechanisms is that the locking arm device, for ensuring engagement with the lock and release device also in the event of unfavourable initial angular positions of the latter device during the disengagement, comprises two mutually independent locking arms, which renders the construction more complicated and necessitates the release first of the one and then of other locking arm for causing reengagement. Both in the construction according to Swedish Patent Specification No. 145,127 and in the construction according to Swedish Patent Specification No. 400,019 use is made, as the lock and release device, of axially projecting pins on the ratchet of the non-reverse mechanism.

The object of the present invention is to simplify those disengagement and reengagement apparatuses which are previously known from, for example, the above-mentioned patent specification and, moreover, to improve their function.

To this end, the apparatus according to the invention is characterized in that the locking arm consists of a separately disposed arm which is pivotally mounted on a pivotal lever included in the arm system of the apparatus, and is disposed, on pivoting of the lever by means of the operating member of the apparatus for switching the arm system and the clutch from the engagement position to the disengagement position, to be moved by means of the lever against the action of spring bias to a position for engagement with the locking member, and that the locking arm and lever display abutments provided for mutual cooperation in order, by mutual engagement when the locking arm engages the locking member, to prevent pivoting of the locking arm in one direction in relation to the lever, and thereby to prevent rotation of the locking member in the locking direction.

The nature of the present invention will be more readily understood from the following brief description of the accompanying drawings, and discussion relating thereto.

Figure 2:
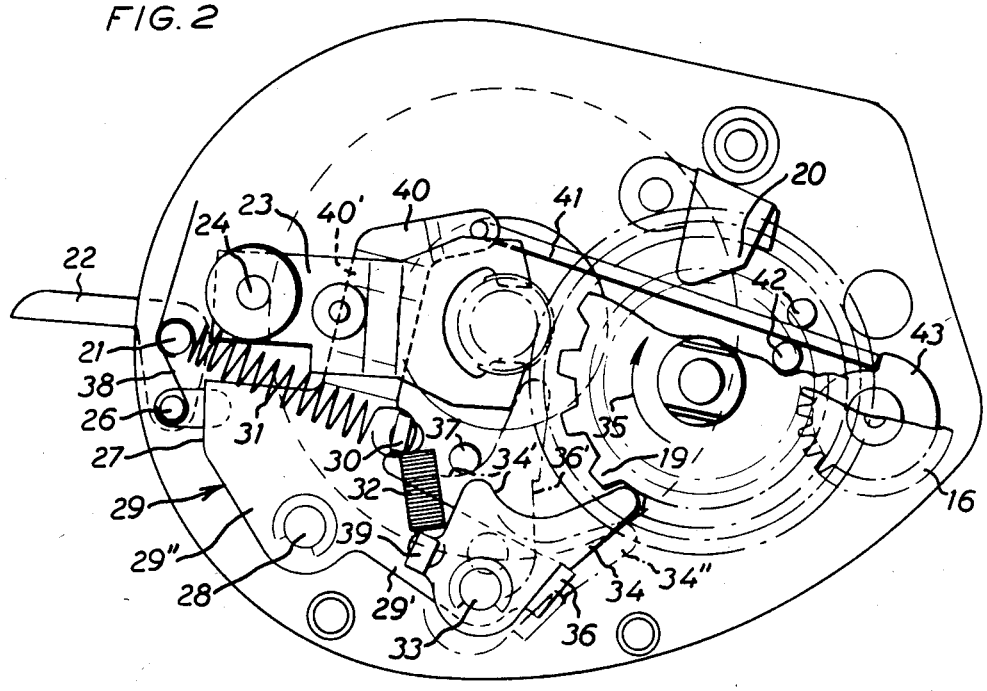

In the accompanying drawings:

FIG. 1 is a fragmentary axial sectional view of a fishing reel provided with a disengagement and reengagement apparatus according to the invention; and FIG. 2 is a plan view of a frame end plate dismounted from the fishing reel of FIG. 1 and mounting parts of the disengagement and re-engagement apparatus.

The fishing reel illustrated but fragmentarily in FIG. 1 comprises a frame 1 with two side walls or plates, interconnected by connection means, of which plates only the one, the side plate 2 located on the crank side of the reel is shown, a line spool 3 being mounted between the side plates and being journalled by means of bearings 4 on a shaft 5. A casing 6 is connected to the frame wall plate 2 and together with the plate 2 forms a housing for a transmission driven by the crank (not shown) by the intermediary of a shaft 7 for operation of the line spool 3 by the intermediary of a disengageable clutch. This clutch comprises a clutch portion, generally designated 9, carried on the one end wall 8 of the line spool 3, and a second clutch portion 10 shiftably mounted on an end portion of the shaft 5. The first coupling portion 9 may consist of an annular, axial flange on the outer side of the end wall 8 of the line spool 3 and a number of radially inwardly directed projections 11 from the annular flange. The second coupling portion 10 is, in the illustrated embodiment, designed in a continuous piece with a gear wheel 12 which is rotatably and shiftably journalled on the above-mentioned end portion of the shaft 5 and forms part of the transmission driven by the crank. In the illustrated embodiment, the unit 10 and 12 shiftable on the shaft 5 is journalled on a sliding surface which consists of the circumferential surface of a spacer sleeve 13 mounted on the end portion of the shaft between adjacent bearings 4 and an axial adjustment member 13' for the line spool.

A gear wheel 14 fixedly disposed on the shaft 7 of the crank engages with the gear wheel 12. The unit consisting of the gear wheel 12 and the clutch 10 is shiftable in a per se known manner into and out of engagement with the clutch portion 9 while retaining engagement between the gear wheels 12 and 14. For this purpose, the gear wheel 12 is of a relatively large axial length.

Moreover, in the illustrated embodiment a second gear wheel 15 is mounted on the shaft 7 connected to the crank, this second gear wheel driving a gear wheel 16 on the one end portion of an involute screw 17 which forms part of a level-wind mechanism generally designated 18. Furthermore, a ratchet 19 is mounted on the inner end of the shaft 7, with which ratchet an anti-reverse pawl 20, as illustrated in FIG. 2, cooperates.

The line spool 3 can be rotated by means of the crank by the intermediary of the gearing consisting of the gear wheels 12 and 14 and by the intermediary of the clutch 9 and 10. Moreover, the level-wind mechanism 18 can be driven by the intermediary of the gearing consisting of the gear wheels 15 and 16. In a known manner, the crank is prevented, by means of the ratchet 19 and pawl 20, from rotation in the reverse direction whereby operation of the line spool and level-wind mechanism 18 by means of the crank in the reverse direction is prevented. The anti-reverse mechanism 19 and 20 may possibly be disengaged, and also in a known manner the line spool 3 may be disengaged from the transmission such that the line spool may freely rotate on the shaft 5 during a cast. The operating device for disengagement of the clutch consists, in the embodiment illustrated in FIG. 1, of an operating button "operating key" 22 mounted between the frame wall plates 2 of the fishing reel (of which only one is shown) and pivotal on a shaft 21.

The disengagement apparatus between the operating key 22 and the shiftable clutch portion 10 consists in a known manner, of an arm 23 which has a claw or fork-like end portion 23' whose prongs engage in diametric groove portions on a connecting portion 10' between the clutch portion 10 and the gear wheel 12. The arm 23 is shiftably mounted on a shaft 24 which is connected to the frame wall plate 2 and is parallel to the shaft 5 of the line spool 3. Moreover, the shaft 24 is displaceable at right angles to its longitudinal axis against the action of a return spring 25 in a direction to the right with respect to FIG. 1, by means of the operating key 22 for shifting the unit comprising the clutch portion 10 and the gear wheel 12 in a direction to the right on the shaft 5 to the disengaged position in relation to the clutch portion 9 on the line spool. This arrangement agrees in principle with the corresponding arrangement in the above-mentioned patent specification No. 400,019 and, like the disengagement apparatus in that patent specification, the clutch portion is automatically returned by spring force when the crank is rotated in the line-retrieval direction.

The apparatus according to the invention differs, however, from other prior art apparatuses, and thus also from the apparatus according to the above-mentioned patent specification, in that the ratchet as such, that is to say its teeth, is included as a component in the disengagement and reengagement apparatus for the line spool.

The apparatus further includes a pin 26 carried on the operating key 22 and shiftable in a slot 27 in the frame wall plate 2 for actuation of the one arm section of a lever 29 pivotally mounted on a pin 28, the lever 29 being pivotal by means of the operating key 22 a certain angle about the pin 28 in a clockwise direction with respect to FIG. 2, the lever 29 actuating the clutch arm 23 in a direction for disengagement of the clutch. Simultaneously, a draft spring 31 placed under tension between the shaft 21 and a spring anchorage 30 on the lever 29 is flexed. A locking arm 34 which is biased by a second draft spring 32, is pivotally mounted on a pin 33 on the lever 29 and is independent of the pawl 20 is then moved into engagement between two teeth on the ratchet 19 fixedly disposed on the crank shaft 7. The ratchet is rotatable by means fo the crank in the direction indicated by the arrow 35 in FIG. 2, but it locked in the opposite direction (the reverse direction) by means of the pawl 20. In the reverse direction (in the direction opposite that indicated by the arrow 35 in FIG. 2), the ratchet 19 may be turned but a very small angle which is less the angle between two indentations, before the pawl 20 prevents further rotation of the ratchet 19 in the reverse direction. This slight angular movement of the ratchet 19 could permit the locking arm 34 to move into engagement in an indentation so as to assume the locking position illustrated in FIG. 2 when the lever 29 is pivoted by means of the operating key for disengagement of the clutch 9, 10. However, in the illustrated embodiment, the apparatus functions such that, on pivoting of the lever 29 by means of the operating key 22 in a clockwise direction with respect to FIG. 2, the locking arm 34 is first moved from the position 34' shown by phantom lines in FIG. 2, substantially radially outwardly to the right, the locking arm 34 first sliding with its rear face on the ratchet in order thereafter to move freely and be pivoted in a clockwise direction about the pin 33 by means of its spring 32. When the operating key 22 is pivoted to the disengagement position, the locking arm 34 assumes, thus, the position 34" intimated by broken lines in FIG. 2, slightly to the right of the position at 34 shown by means of solid lines. Moreover, when the operating key 22 is thereafter released and the spring 31 tends to pivot back the arm 29, the locking arm 34 is moved with its end towards the ratchet 19 and probes into engagement in an indentation between two ratchet teeth (the position at 34 shown by solid lines in FIG. 2). In this position, the locking arm 34 and the lever 29 mutually lock each other and lock the clutch 9, 10 in the disengagement position. This mutual locking is realized by the action of the spring 31 and by the engagement between an abutment on, or recess 36' in the locking arm 34 and an projection 36 on the lever 29 at its one, outer end. After operation by means of the operating key 22 for disengagement, the clutch arm 23 and the clutch portion 10 are, therefore, retained in the disengaged position by means of the above-described locking mechanism 19, 34, 36. The spring 31 which, in the locking position (FIG. 2) of the locking mechanism 19, 34, 36, is under tension and strives to swing the lever 29 in a counterclockwise direction with respect to FIG. 2, is not capable of executing this swinging movement because the lever 29, the locking arm 34 and the ratchet 19 lock one another.

When, after a cast with the line spool disengaged, the crank is turned in the direction corresponding to line retrieval, the ratchet 19 is rotated in the direction shown by means of the arrow 35, this being permitted by both the pawl 20 and the locking arm 34, whereby the locking arm 34 is pivoted in a counterclockwise direction with respect to FIG. 2 and then tending to be moved away from engagement with the projection 36 on the lever 29. As a result, the spring 31 can pivot the lever 29 inwardly, that is to say counterclockwise in FIG. 2, to the initial position, whereby the clutch arm 23 is returned by means of the spring 25 (please see FIG. 1) and thereby returns the clutch portion 10 into engagement with the clutch portion 9 on the line spool.

It is apparent from FIG. 2 that the locking arm 34 provided for releasable locking of the disengagement apparatus in the disengagement position for the line spool can, independently of the angular position of the crank and the transmission of disengagement, always be moved into engagement in an indentation on the ratchet 19, which either takes place directly into a free indentation or after a slight turning of the ratchet 19 a fraction of a revulotion realized by the locking arm 34 under the action of the spring 32. It will also be apparent from FIG. 2, that as little as a slight rotation of the crank (and a corresponding rotation of the ratchet, for example roughly 15°–20°) realizes triggering of the return motion of the disengagement apparatus from the disengagement position to the engagement position for the line spool. Since reengagement by means of the crank takes place against the action of the spring 32, the spring 32 will act as a means against unintentional re-engagement.

In order to prevent the locking arm 34 from slipping on the teeth of the ratchet 19 when the line spool is engaged and being driven for retrieval of the line by means of the crank, a shoulder 37 may be provided on the frame wall plate 2 for such cooperation with a projection 34' on the locking arm 32 that the locking arm 34 avoids the shoulder 37 on pivoting of the lever 29 from an inner position (the engagement position) by means of the operating key 22 to the outer position (the disengagement position) shown in FIG. 2. However, when the arm 29 is returned and the draft spring 32 strives to pivot the locking arm 34 in a clockwise direction, such pivoting is prevented by the shoulder 37 which then lies in abutment on an edge surface of the projection 34', whereby the locking arm 34 is retained in a position moved away from the ratchet 19.

FIG. 2 shows a further spring which is designated 38 and acts as a preloading spring between the pivot shaft 21 for the operating key 22 and the pin 26 connected to the operating key 22. The spring 38 is placed under tension when the operating key 22 is actuated for disengagement, and strives to return the operating key 22 as soon as this is released. Return of the operating key 22 to the initial position after disengagement has no effect on the remainder of the disengagement apparatus, which, after disengagement, is locked in the above-described manner by means of the locking arm 34.

The draft spring 31 of the lever 29 has a double function, that is to say apart from the function of being placed under tension of disengagement and returning the lever 29 on reengagement of the line spool, the spring 31 has the function of forming a counterforce against operation of the operating key 22 for release, in order thereby to prevent release as the result of an unintentional, relatively slight contact on the operating key 22. The requisite disengagement pressure can be altered by replacement of the spring 31 or by making the spring 31 adjustable.

The spring 38 also acts as a resilient bias against operating of the operating key 22, but the actual task of the spring 38 is merely to return the operating key 22 proper, and the spring 38 can, therefore be relatively weak.

In the illustrated embodiment, the draft spring 32 of the locking arm 34 is placed under tension between a spring-anchorage 39 on the arm 34 and the spring-anchorage 30 which also forms a spring achorage for the spring 31 whose other anchorage is formed by the pivot shaft 21 of the operating key 22, but, naturally, other spring anchorage than those illustrated may be selected. For example, the spring 32 could act between the locking arm 34 and a point on the plate 2 and the spring 31 could act between another point on the lever 29 and a point on the plate 2. These and other modifications obvious to the skilled reader fall within the spirit scope of the inventive concept which is defined in the appended claims.

In the illustrated embodiment, the pivotal lever 29 is in the form a double-armed lever whose one arm 29' carries the locking arm 34 and whose other arm 29" is actuable by means of the operating key 22 and has a projection 40 which, with a bent central portion 40', extends between the frame wall plate 2 and the clutch arm 23 for shifting of this arm into the engagement position when the lever 29 is pivoted counterclockwise to the position shown in FIG. 2 from a position in which the locking arm 34 is supported in the position 34' shown by phantom lines. The projection 40 of the lever 29 is disposed, on actuation of the clutch arm 23 for disengagement simultaneously to act, by the intermediary of a linkage rod 41 which is guided between guide members 42 on the plate 2, on a member 43 forming part of the level-wind mechanism 18 for release of a level-wind carriage (not shown) from engagement with the fishing line. However, the lever 29 could be of a different design from that shown and described and need not necessarily be designed as an integral piece with the portion 49 which acts on the clutch arm 23, nor be disposed to actuate a level-wind carriage which is releasable from the fishing line. The essential function of the lever 29 according to the present invention is that it is actuable by the operating key 22 for disengagement of the clutch between the line spool and transmission 12, 14 and carries a locking arm 34 which is pivotal or rotatable relative to the transmission and which releasably locks the disengagement apparatus in the disengagement position by engagement with the ratchet 19, and that the ratchet 19, by being driven by the crank in a direction corresponding to the line-retrieval direction, triggers the re-engagement operation in the described manner.

What we claim and desire to secure by Letters Patent is:

1. In a fishing reel,
   a base,
   a rotatably mounted line spool,
   a driving means including
     a handle crank connected to rotate said line spool in a line retrieval direction,
   a ratchet member having a plurality of projections and mounted to be rotated in one direction by said driving means when said line spool is rotated in the line retrieval direction,
   a clutch between said line spool and said driving means,
   a clutch operating mechanism including
     a manually operable lever pivotally mounted on said base,
     a first spring means connected between said lever and said base,
     means operable by an operator for moving said lever against the action of said first spring means from a first to a second position to effect release of said clutch corresponding respectively to engaged and disengaged positions of said clutch, said first spring means acting to return said lever to said first position to effect engagement of said clutch, a disengageable locking mechanism means for locking said clutch in the disengaged position against the action of said first spring means, said locking mechanism including said ratchet member, said lever, a locking arm, and means pivotally mounting said locking arm on said lever for angular movement of said locking arm between two angularly spaced rest and abutment positions on said lever, said lever having abutment means thereon to limit movement against said abutment means of said locking arm when said locking arm is in said abutment position, said locking arm having a projecting portion extending into and nestled between two of said projections of said ratchet member during rest position of said locking arm and disengaged position of said clutch, said locking arm pivotable on said lever from said rest position to said abutment position by movement of said projections of said ratchet member by rotation of said handle crank, moving said projecting portion of said locking arm, thereby releasing said lever to be returned by said first spring means to said first position, thereby returning said clutch to engaged position.

2. The fishing reel according to claim 1, wherein said disengageable locking system includes a second spring means connected between said locking arm and said lever and acting to pivot said locking arm into said abutment position in relation to said lever.

3. The fishing reel according to claim 1, wherein a fixed abutment is disposed on said base in a position to permit pivotal movement of said locking arm into engagement with said ratchet member on pivoting of said lever for disengagement of said clutch and to prevent pivotal movement of said locking arm when the latter is in its rest position and said lever is in its first position which corresponds to the engaged position of said clutch.

* * * * *